P & S. Conver.
Fruit-Picker.
N° 72804.    Patented Dec. 31, 1867.
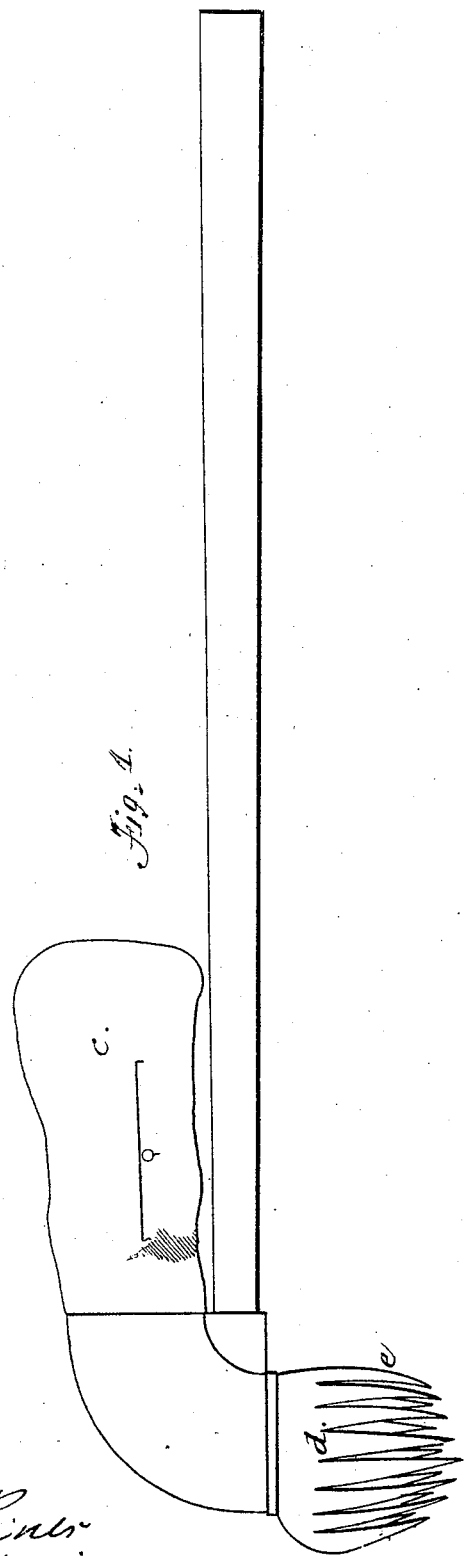
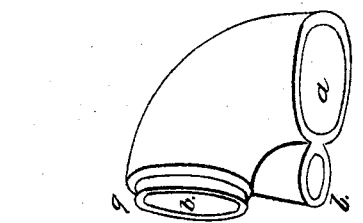
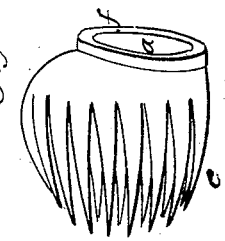
Witnesses:
J. C. Riner
David Morein
Inventor:
Peter Conver
Samuel Conver

United States Patent Office.

PETER CONVER AND SAMUEL CONVER, OF YATES CITY, ILLINOIS.

Letters Patent No. 72,804, dated December 31, 1867.

IMPROVEMENT IN FRUIT-PICKER.

The Schedule referred to in these Letters Patent and making part of the same.

TO ALL WHOM IT MAY CONCERN:

Be it known that we, PETER CONVER and SAMUEL CONVER, of Yates City, in the county of Knox, in the State of Illinois, have invented a new and useful Machine for Plucking Fruit from the Trees or Bushes; and we do hereby declare that the following is a full and exact description thereof, reference being had to the accompanying drawings, and to the letters of reference marked thereon, making part of the specification, in which—

Figure 1 is a perspective view,
Figure 2 a partial section,
Figure 3 a partial section, and
Figure 4 a partial section.

We construct the machine by making a base or body for it of some substantial material, as cast iron, brass, sheet iron, or tin, or some other proper material, of a tubular form, with a curve in the middle, of about forty-five degrees. The tube is made some four inches in diameter, and some five inches in length, with an eye fastened on the inside of the curve, to insert a pole or handle, as shown at letter $b$, in fig. 2 of the drawings, (fig. 2 being the base or body here described.) Fig. 3 represents a comb-toothed rim, constructed to fit on the upper end of the tube, fig. 2, letter $a$. It is made so that it can be removed by fitting on a flange and fasten with a hasp or some other device, as shown in accompanying drawings. The teeth on this rim may be from two to three inches in length, and from one-half to one and a half inch apart, to suit size of fruit, as shown at letter $e$, fig. 3; this rim to correspond in diameter with the tube or base, fig. 2. Fig. 4 is a comb-toothed rim, of coarser teeth than that of fig. 3, to fit on the machine the same, but suited for larger fruit. We construct a bag of canvas to hold about half a peck, the mouth to fit on the lower end of the base, letter $a$, fig. 2, and fastened on, as shown in fig. 1, letter $c$; also, a handle or pole, to fit in the eye, of suitable length to reach the fruit, of suitable thickness and strength to make it carry steady to the proper height, in using the machine in plucking fruit, is made and inserted into the eye, as shown in fig. 1 of the drawings.

This machine, when complete, as shown in fig. 1, can be used to pluck fruit of all sizes by merely changing the comb from one size or number to another, to suit size of fruit; as, when you have used it with a fine comb for berries or cherries, you wish to use it for apples or peaches, you place a comb, perhaps twice as coarse as the former one, on the machine.

This machine can be applied successfully in almost every position that the fruit can be placed in on the tree or bush, as the under teeth will answer to pluck the fruit on the top of the branches, the side teeth for the fruit on the sides of the branches, and the top teeth for the fruit that hangs on the under side of the limbs or branches. It may be used for all sizes of trees, by a change of poles, from a gooseberry-bush to the tallest cherry or apple-tree. It is used by taking hold of the pole and reaching to the fruit, passing the rim of comb-teeth over the fruit, then pushing the machine forward toward the fruit, so that the stem of the fruit will pass between the teeth to the back end of the teeth, then pull till the fruit comes off, and it rolls down the tube into the bag, shown at letter $c$, fig. 1, of drawings.

What we claim as our invention, and desire to secure by Letters Patent, is—

The pectinated crown $d$ and body A, as formed and constructed, in combination with handle D and bag C, when all are arranged in the manner herein set forth and described.

PETER CONVER,
SAMUEL CONVER.

Witnesses:
J. C. RENER,
DAVID MOREIN.